H. E. HARNISH.
ASSORTING CONVEYER.
APPLICATION FILED MAR. 20, 1919.
1,305,900.
Patented June 3, 1919.
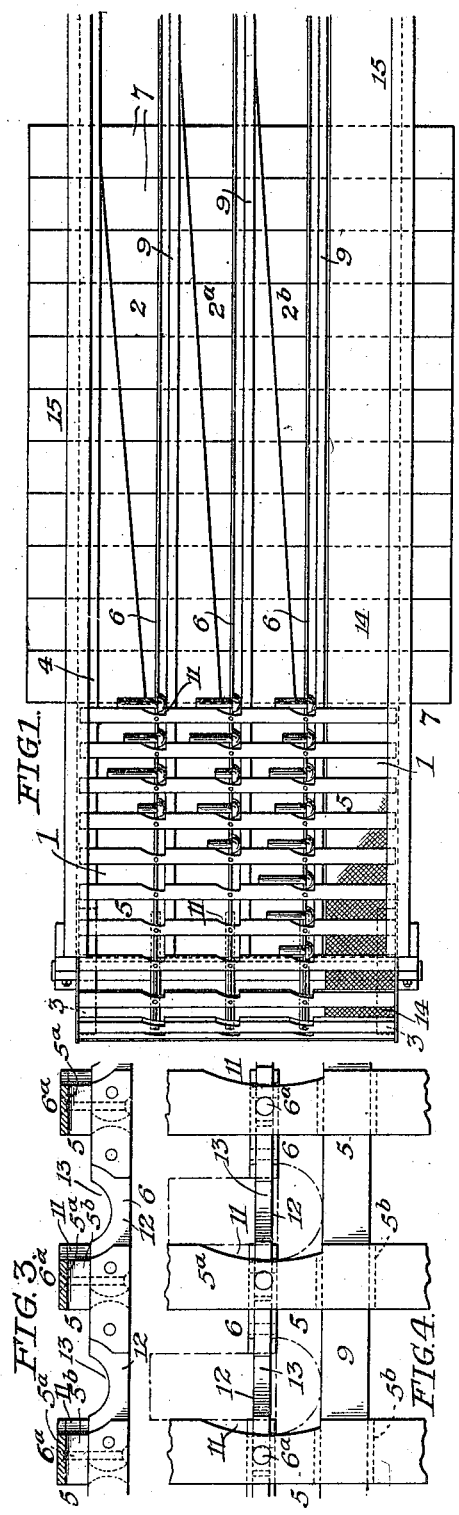
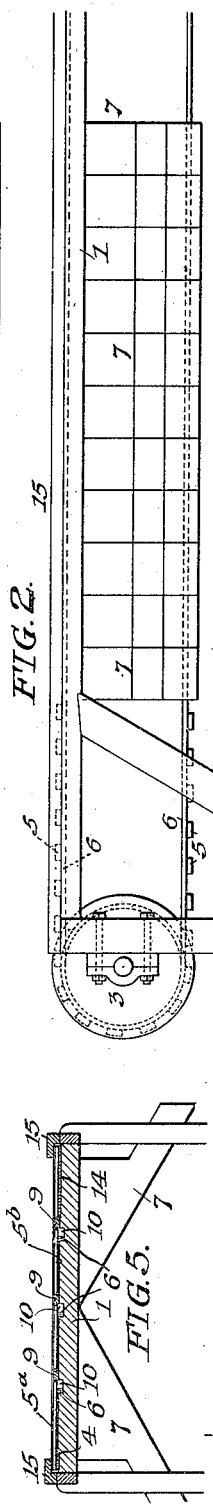
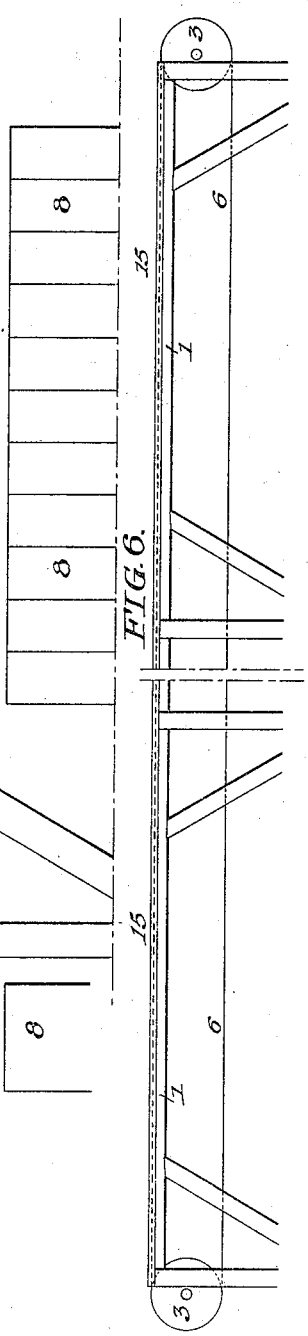
Inventor:
Harry E. Harnish
by his Attorneys

UNITED STATES PATENT OFFICE.

HARRY E. HARNISH, OF PHILADELPHIA, PENNSYLVANIA.

ASSORTING-CONVEYER.

1,305,900.  Specification of Letters Patent.  Patented June 3, 1919.

Application filed March 20, 1919. Serial No. 283,692.

*To all whom it may concern:*

Be it known that I, HARRY E. HARNISH, a citizen of the United States, residing in Philadelphia, Pennsylvania, have invented certain Improvements in Assorting - Conveyers, of which the following is a specification.

My invention relates to sorting or sizing machines, and the particular object of my invention is to provide mechanism adapted for the automatic sorting of bolts, rivets, screws and similar articles of different lengths.

My invention involves the use of a slatted conveyer adapted to carry bolts, screws, rivets or the like, over a table provided with one or more tapering slots, which are disposed over compartments or chutes adapted to receive the bolts, screws, rivets or the like which drop through the slot or slots when they reach that portion of the same whose width equals their length. A further feature of my invention is the provision of a special form of chain or conveyer to receive the bolts, rivets, screws, or the like, in spaced relation.

These and other features of my invention are more fully described hereinafter, reference being had to the accompanying drawings, in which:

Figure 1, is a plan view of sufficient of the slotted table and the slatted conveyer for moving the bolts, rivets, and the like over the same, to illustrate my invention.

Fig. 2, is a side elevation of the same.

Figs. 3 and 4, are views illustrating details of the conveyer employed to move the rivets, and Figs. 5 and 6, are views illustrating other details of my invention.

In the drawings, 1 represents a table or similar structure having one or more slots 2, 2ª, &c., which taper in width; the narrowest end being disposed toward the approaching bolts, rivets, etc., which are intended to fall through the same at different intervals. At each end of the table 1, guide wheels 3 may be arranged for belts 4, to which belts slats 5 are attached, and intermediate said belts, chains 6 are also connected at 6ª to the slats so as to move therewith; such chains and belts moving together. The slats are spaced apart a sufficient distance to receive single bolts, rivets, or the like between the same.

Suitable compartments to receive the rivets, bolts, and the like, may be placed beneath the slots in the table, or chutes 7 may be provided to deliver the sorted bolts, rivets or the like to boxes, kegs or barrels 8, disposed in position alongside the sorting table.

Mounted on the bed of the table adjacent the chains 6, are longitudinally extending rails 9, and the bed of the table may be recessed at 10 alongside these rails to accommodate the chains and the heads of the bolts, rivets, &c. The cross slats 5 may be made up of a plurality of members, and in the present instance I have shown them as consisting of cross bars 5ª, which may be of metal and may be adapted to ride on the rails 9, and sections 5ᵇ, which may be of wood, attached to the cross bars 5ª and lying between the rails 9; the fastenings 6ª for the chains, which may be in the form of rivets or screws, passing through the cross bars 5ª and the sections 5ᵇ. The sections 5ᵇ may be arranged to clear the table, with the cross bars 5ª riding on the rails 9, or the cross-bars 5ª may be arranged to clear the rails, with the sections 5ᵇ riding on the table. The driving belts 4 are attached to the under sides of the outer sections 5ᵇ at the ends of the slats.

The slats, adjacent their point of engagement with the chains 6, are preferably recessed at 11, while the chain itself is provided with special links 12, recessed at 13, to receive the neck of the bolt, rivet, or the like; the rest of which may contact with the table as it is moved along, while the recesses 11 of the slats accommodate the heads of the same. When passing over the table 1, said heads preferably lie between the chains and the rails, as indicated in the drawings. In this way, each bolt, rivet, or the like is individually spaced and carried along by the conveyer, and when it reaches the point of the slot equaling its length, it will tip over and drop into one of the receptacles beneath the chain or into one of the chutes 7 whereby it may be passed to one of the receptacles 8.

It will be understood of course that the machine forming the subject of my invention may be of any length desired, and that the conveyer may pass over a series of tapered slots disposed at various points throughout the length of the table upon which the bolts, rivets, or the like, may be placed, similar in all respects to the arrangement of slots and other accessories as shown in Fig. 1, which illustrates a plurality of rivets adjacent the slats of the conveyer just before they reach the slots in the table. The slats are omitted over the slots for the sake of clearness. Each of these succeeding series of slots will be constructed and arranged in a manner precisely similar to that shown in Fig. 1, and operators may be disposed contiguous to the plain portions of the table in advance of the slots in order that other bolts, rivets, and the like, of different sizes, shapes and conditions may be sorted at various points throughout the machine.

The table is shown as having three slots, 2, 2ª and 2ᵇ. This leaves a blank space at one side of the table, and here the conveyers may carry a continuous or endless canvas section 14, forming a belt and providing means for carrying rivets, bolts, and the like, forward from the front end of the machine to be assorted at other points in the line of the table. Such belt, for example, may receive and carry forward one kind of rivets (differently sized) or one kind of bolts (differently sized), where there are several kinds or types of rivets, bolts, and the like, to be sorted.

The sides of the table are preferably provided with guards 15, which may overlie the ends of the slats, and these guards may be of metal, wood or other suitable material.

I claim:

1. The combination of a slotted table, rails extending longitudinally of the table adjacent the slots, chain conveyers movable over such table; said chains being disposed adjacent said rails whereby the heads of rivets, bolts and the like may be disposed between the rails and the chains, means for moving the chains, and guiding means for delivering the bolts, rivets and the like which fall through the slots at different places.

2. The combination of a slotted table, rails extending longitudinally of the table adjacent the slots; said table being longitudinally recessed adjacent said rails, slatted conveyers movable over such table; said conveyers having continuous portions disposed adjacent said rails whereby the heads of rivets, bolts and the like may be disposed between the same and the rails, means for moving the conveyers, and chutes for delivering the bolts, rivets, and the like which fall through the slots of the table.

3. The combination of a slotted table, rails extending longitudinally of the table adjacent the slots, chain conveyers movable over such table; said chains being disposed adjacent said rails whereby the heads of rivets, bolts and the like may be disposed between the rails and the chains; said chains being recessed to accommodate the body of the bolts, rivets, and the like, means for moving the chains, and chutes for delivering the bolts, rivets and the like which fall through the slots of the table.

4. The combination of a slotted table, rails extending longitudinally of the table adjacent the slots, chain conveyers movable over such table; said chain conveyers comprising recessed links and slats extending across the chains and recessed adjacent the recessed links, means for moving the chain conveyers, and receptacles for the bolts, rivets, and the like which fall through the slots.

5. The combination of a slotted table or bed, rails extending longitudinally of the table adjacent the slots, chain conveyers movable over such table; said chains being disposed adjacent said rails whereby a space is provided to accommodate the heads of rivets, bolts, and the like, carried by the chains and the table being longitudinally grooved or recessed in registery with such space in line with the slots, means for moving the chains, and receptacles for the bolts, rivets, and the like, which fall through the slots.

6. The combination of a slotted table, a rail extending longitudinally of the table adjacent said slot and parallel with one side of the same, a slatted conveyer movable over such table; said conveyer having a continuous portion disposed adjacent said rail whereby the heads of rivets, bolts, and the like, may be disposed between the same and the rail, means for moving the conveyer, and receptacles for the assorted bolts, rivets, and the like, which fall through the slot of the table.

7. The combination of a table or bed having a plurality of slots, rails extending longitudinally of the table and parallel with one side of the slots, an endless conveyer movable over such table; said conveyer comprising a plurality of chains disposed adjacent said rails whereby the heads of rivets, bolts, and the like, to be assorted may be accommodated between the rails and the chains and cross slats connected to said chains, means for moving the conveyer, and receptacles for the assorted bolts, rivets, and the like, which fall through the slots of the table.

8. The combination of a slotted table, rails extending longitudinally of the table adjacent the slots, a conveyer movable over such table; said conveyer comprising chains having recessed links and slats extending across the chains; the chains being disposed adjacent said rails whereby the heads of rivets, bolts, and the like, may be disposed between the rails and the chains, and the slats being recessed to receive the heads of the bolts, rivets, and the like, means for moving the conveyer, and chutes for delivering the assorted bolts, rivets, and the like, which fall through the slots to suitable receptacles.

9. The combination of a slotted table or bed, rails extending longitudinally of the table adjacent the slots, a conveyer movable over such table; said conveyer comprising chains disposed adjacent said rails whereby a space is provided to accommodate the heads of rivets, bolts, and the like, a plurality of slats carried by the chains and a belt; said slats forming discontinuous conveying means and the belt forming continuous conveying means, means for moving the conveyer, and receptacles for the bolts, rivets, and the like, which fall through the slots.

10. The combination of a slotted table, a rail extending longitudinally of the table adjacent said slot and parallel with one side of the same, a slatted conveyer movable over such table; said conveyer having a plurality of continuous portions, one of which is disposed adjacent said rail whereby the heads of rivets, bolts, and the like, may be disposed between the same and the rail, a belt carried by the conveyer and forming a continuous carrier for bolts, rivets, and the like, means for moving the conveyer, and receptacles for the assorted bolts, rivets, and the like, which fall through the slot of the table.

11. The combination of a table having a plurality of assorting slots, conveying means movable over the table; a portion of such conveying means being continuous whereby rivets, bolts, and similar articles may be carried continuously throughout the length of the table while the other portion of said conveyer is discontinuous whereby the rivets, bolts, and similar articles conveyed by the same may drop through the slots and automatically assort themselves.

12. The combination of a table having a plurality of assorting slots, conveying means movable over the table, a portion of such conveying means being in the form of a continuous belt whereby rivets, bolts, and the like may be carried throughout the length of the table while the other portion of said conveyer is discontinuous and comprises slats which serve to move and space the rivets, bolts, and the like whereby they may drop through the slots at intervals and automatically assort themselves.

13. The combination, in a conveyer for moving headed articles such as bolts, screws and the like, of a plurality of chains, and cross slats connected to said chains; said chains having grooved links to engage and receive portions of the articles to be conveyed, and the slats being arranged to coöperate therewith.

14. The combination, in a conveyer for moving headed articles such as bolts, screws and the like, of a plurality of chains, and cross slats connected to said chains; said chains having grooved links to receive the necks of the articles to be conveyed, and the slats having notched edges to accommodate the heads of the same.

15. The combination, with a table having a groove, of a conveyer for headed articles adapted to pass over said table; said conveyer comprising a chain adapted to the groove of the table and having links engaging portions of the articles to be moved, and cross bars or slats having portions coöperating with said chain links to engage and space the articles being moved.

16. The combination, with a table having a groove, of a conveyer for headed articles adapted to pass over said table; said conveyer comprising a chain adapted to the groove of the table and having links engaging and receiving the necks of the articles to be moved, and cross-bars or slats having notched portions to accommodate the heads of said articles.

17. The combination, in a conveyer for moving headed articles such as bolts, screws and the like, of a discontinuous portion individually spacing the articles conveyed, and a continuous portion receiving articles in bulk.

18. The combination, in a conveyer for moving headed articles such as bolts, screws and the like, of a slatted portion spacing individual articles conveyed, and a continuous portion alongside the same and moving therewith for receiving articles in bulk.

19. In a conveyer, the combination of a chain having a plurality of sets of links, some of which are grooved, and cross-bars connecting said chains and secured to the grooved links; the latter accommodating portions of the articles conveyed and in operative engagement with the cross-bars.

20. In a conveyer, the combination of a chain having a plurality of sets of links, some of which are grooved, and cross-bars connecting said chains and secured to the grooved links; said cross-bars being notched to accommodate the portions of the articles being conveyed.

HARRY E. HARNISH.

Copies of this patent may be obtained for five cents each, by addressing the "Commissioner of Patents, Washington, D. C."